United States Patent
Wong et al.

(10) Patent No.: US 7,941,516 B2
(45) Date of Patent: May 10, 2011

(54) REDUNDANT PILE OF INEXPENSIVE DRIVERS (RPID)

(75) Inventors: Curtis G. Wong, Medina, WA (US);
Dale A. Sather, Seattle, WA (US);
Kenneth Reneris, Clyde Hill, WA (US);
Thaddeus C. Pritchett, Edmonds, WA (US); Talal Ali Batrouny, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/764,047

(22) Filed: Jun. 15, 2007

(65) Prior Publication Data

US 2008/0313324 A1 Dec. 18, 2008

(51) Int. Cl.
*G06F 15/173* (2006.01)
(52) U.S. Cl. ...................................................... 709/223
(58) Field of Classification Search .................. 709/200, 709/203, 223, 224; 711/172
See application file for complete search history.

(56) References Cited

U.S. PATENT DOCUMENTS

| 7,124,184 | B2* | 10/2006 | Chung et al. | 709/224 |
|---|---|---|---|---|
| 2002/0035669 | A1* | 3/2002 | Baek et al. | 711/114 |
| 2004/0148632 | A1* | 7/2004 | Park et al. | 725/81 |
| 2005/0021606 | A1 | 1/2005 | Davies et al. | |
| 2006/0090057 | A1* | 4/2006 | Saliba | 711/172 |
| 2007/0016745 | A1 | 1/2007 | Dalton et al. | |

OTHER PUBLICATIONS

International Search Report and Written Opinion for PCT Application No. PCT/US2008/067051 completed Feb. 12, 2009, mailed Feb. 13, 2009, 10 pages.

* cited by examiner

*Primary Examiner* — Frantz B Jean
(74) *Attorney, Agent, or Firm* — Lee & Hayes, PLLC

(57) ABSTRACT

The claimed subject matter provides a system and/or method that manages storage media associated with a plurality of disparate devices. The disclosed system can include a network of disparate devices wherein each device in the network can be associated with storage media. Additionally, the disclosed system can also include a component that identifies each device in the network, associates a likelihood that the device will periodically leave or rejoin the network, and utilizes the associated likelihood to construct a logical redundant pile of inexpensive disks comprising the storage media associated with the disparate devices.

20 Claims, 9 Drawing Sheets

REDUNDANT PILE OF INEXPENSIVE DRIVERS (RPID)

BACKGROUND

Advancements in networking and computing technologies have transformed many aspects of everyday life and in particular have transformed computers from being low performance/high cost devices capable of performing elementary word processing and simplistic/basic mathematical computations and manipulations to high-performance/low-cost machines capable of a myriad of disparate and highly complex functions and utilities. For instance, computers have become household staples rather than luxuries, educational tools, and/or entertainment centers, and can provide individuals and corporations tools to manage and forecast finances, control operations such as heating, cooling, lighting and security, and store records, and images in a permanent and reliable medium. As further illustration, at the consumer level computing devices can be employed to aid users in paying bills, tracking expenses, communicating nearly instantaneously with friends and/or family across vast distances by way of e-mail and/or instant messaging, obtaining information from networked the repositories, and numerous other functions/activities.

As computing and network technologies have evolved and have become more robust, secure and reliable, more consumers, wholesalers, retailers, entrepreneurs, educational institutions, and the like have and are shifting business paradigms and are employing the Internet to perform business rather than utilizing traditional means. For example, today consumers can access their bank accounts on-line (e.g., via the Internet) and can perform an ever growing number of banking transactions such as balance inquiries, fund transfers, bill payments, and the like.

Conventionally, only multinational corporations, governmental entities and organizations, and/or professional companies have been able to afford and benefit from Redundant Array of Inexpensive Drive (RAID) technologies. Such technologies have typically been employed to store large amounts of data (e.g., financial transactions, component parts lists, and the like) in a secure yet accessible manner. Nevertheless, with the ever growing demands for hard drive space, more affordable and commonly accessible and equivalent techniques would find eager and receptive audiences especially in the area of consumer and household systems.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The subject matter as claimed relates to storage space management solutions, and in particular, to storage space identified by an individual, or automatically identified or determined by a machine effectuated entity, such that the identified storage space and associated devices can be analyzed and/or dynamically pooled and/or virtually amalgamated in a distributed manner to provide for an ad hoc Redundant Pile of Inexpensive Drives (RPID). The claimed subject matter can take advantage of and synchronize existing storage space available on a plethora of common household appliances and devices, such as, for example, multimedia recording and playback devices, kitchen appliances, mobile or cellular telephones, and the like, to provide an inexpensive ad hoc Redundant Array of Inexpensive Drives (RAID) approximation.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
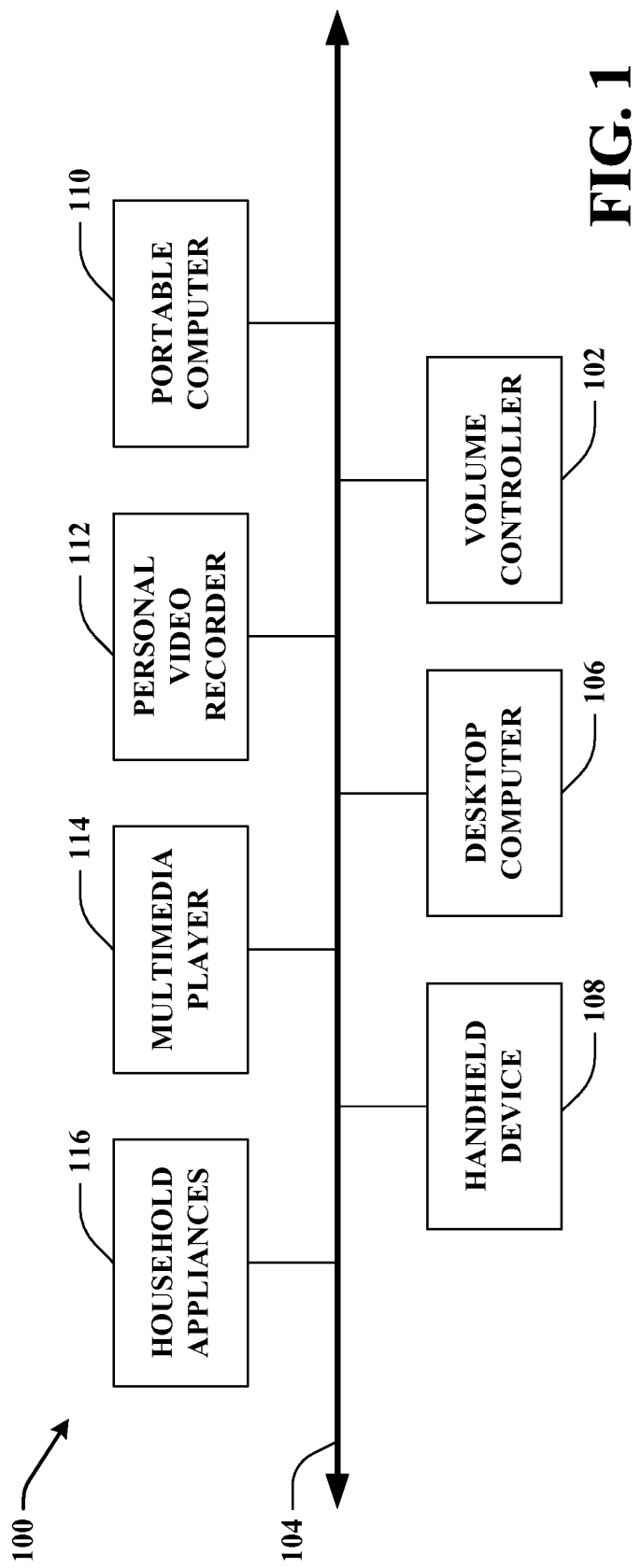
FIG. 1 illustrates a machine-implemented system that manages various storage media associated with a plurality of diverse devices in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Over time there has been an inexorable trend towards home and/or consumer mass storage solutions. Additionally, there has been a move away from utilization of physical media, such as hard disks (e.g., non-volatile storage devices that store or persist digitally encoded data on rapidly rotating platters with magnetic surfaces and/or optically retentive coatings) to the use of non-volatile memory typically employed in memory cards, thumb devices, handy drives, memory sticks, and the like, in many, if not most, home devices and/or appliances. Moreover, in the home or household environment there has been, to date, an unmet need for storage solutions that have taken advantage of extant, and typically under-utilized, physical media associated with domestic appliances and/or devices to provide Redundant Array of Inexpensive Drives (RAID) and/or Redundant Array of Inexpensive Drives (RAID) equivalent storage solutions.

Professionals, corporations, and companies typically employ Redundant Array of Inexpensive Drives (RAID) to persist large amounts of data. Nevertheless, such systems are generally priced well beyond the means of average consumers. With the ever growing demands for hard drive/disk space, a household type RAID system would be beneficial. Since most households already have more than one hard drive/disk containing device in the house, the claimed subject matter can take advantage of and synchronizes extant disk/drive space to provide an ad hoc RAID approximation (a redundant pile rather than a redundant array). The subject matter as claimed can arrange and disseminate extant content from drive/disk to drive/disk in such a way as to optimize accessibility and space, thereby mitigating the need for consumer maintenance. Moreover, additional drives/disks can easily be added to the system as needed, and can automatically be accommodated without user interaction and/or intervention. Accordingly, the claimed subject matter offers the professional results of a RAID system without the exorbitant expenditures and costs typically associated with such systems.

The claimed subject matter in one illustrative aspect relates to storage space management solutions, and more particularly, to storage space identified by an individual, or automatically identified or determined by a machine effectuated entity, such that the identified storage space and associated devices can be analyzed and dynamically pooled or virtually amalgamated in a distributed manner to provide for an ad hoc Redundant Pile of Inexpensive Drives/Devices (RPID).

FIG. 1 illustrates a system 100 that manages various storage media associated with a plurality of disparate devices. System 100 can include volume controller 102 that can identify the storage capabilities of the plurality of disparate devices associated with network topology 104, as well as allocate or assign identified and detected storage media associated with the various devices to pre-established or dynamically created aggregations of storage media to establish a distributed storage system and/or an ad hoc Redundant Pile of Inexpensive Drives/Devices (RPID). Such distributed storage systems and/or ad hoc RPIDs can be employed to effectuate data storage in a secure and redundant manner. As illustrated, volume controller 102 can be a standalone machine that includes a processor. Illustrative machines that can constitute volume controller 102 can include Personal Digital Assistants (PDAs), cell phones, smart phones, laptop computers, notebook computers, multimedia recording and/or playback devices, consumer devices/appliances, hand-held devices, desktop computers, server computing devices, etc. Additionally and/or alternatively, volume controller 102 can be incorporated as a component within a pre-existing machine, for example, a dedicated desktop personal computer. Volume controller 102, as depicted, can be in continuous and operative, or sporadic but intermittent communication via network topology 104 with desktop computer 106, hand-held device 108, portable computer 110, Personal Video Recorder (PVR) and/or Digital Video Recorder (DVR) 112, multimedia player 114, and/or household appliances 116.

Network topology 104 can include any viable communication technology, for example, wired and/or wireless modalities and/or technologies can be employed to effectuate the subject matter as claimed. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof. Additionally and/or alternatively, network topology 104 can employ power (electricity) line communications wherein power distribution wires are utilized for both the simultaneous distribution of data as well as transmission of power (electricity).

As stated above, volume controller 102 can be in continuous and operative, or sporadic and intermittent communications with a number of common consumer and/or household devices. Illustrative consumer and/or household devices can include desktop computers 106 (e.g., personal computers manufactured specifically for use on a desk in an office or home and distinguishable from portable computers such as laptops), hand-held devices 108 (e.g., Personal Digital Assistants (PDAs), cell phones or mobile phones, smart phones, multimedia and Internet enabled mobile phones, etc.), portable computers 110 (e.g., notebook computers, Tablet PCs, laptop computers, and the like), Personal Video Recorders (PVRs) and/or Digital Video Recorders (DVRs) 112 (e.g., any device capable of recording audio/video multimedia presentations without videotape to digital storage media, and playback recorded content from digital storage media), multimedia players 114 (e.g., portable media players capable of storing and/or playing files in one or more media format), and household appliances 116 (e.g., televisions, video recorders, camcorders, High Fidelity home cinema centers, video game controllers, digital audio players, consumer electronics, such as, compact disc players, digital versatile disk players, and home appliances, such as, dishwashers, washing machines, microwave ovens, clothes dryers, and the like).

Volume controller 102 can utilize network topology 104 (e.g., employing power line communications methodologies, and the like) to monitor the removal and/or addition of components that currently constitute network topology 104. For example, volume controller 102 can monitor and/or detect the removal and/or addition of a laptop to network topology 104. On discovering the absence and/or presence of a previously associated device and/or a newly added device, volume controller 102 can identify the type of device being added and/or removed (e.g., hand-held device, kitchen appliance, portable computer, and the like), the size and unused capacity of the storage media associated with the added and/or removed device, and the type of storage media (e.g., volatile and/or nonvolatile memory) associated with the added and/or removed device. Volume controller 102, based at least in part on the aforementioned information, can in this manner establish and/or reorder an agglomeration of previously detected and identified storage media associated with disparate household and consumer devices to form a pile of inexpensive disks/devices.

Volume controller 102 can further utilize one or more of artificial intelligence and/or machine learning methodologies and/or components, external sources (e.g., databases, previously persisted statistical and/or probabilistic tabulations, and the like), and/or concurrently and/or contemporaneously ascertained statistical and/or probabilistic methodologies to dynamically ascertain the likelihood that an added device will subsequently exit a constructed pile of inexpensive disks. Similarly, volume controller 102 can employ artificial intelligence and/or machine learning modalities and/or components to update external sources, and/or concurrently ascertained statistical and/or probabilistic tabulations to reflect the departure of previously associated devices and their affiliated storage media from the established pile of disks.

Additionally, volume controller 102 on ascertaining the type of device, the type of storage media confederated with the device, the likelihood and/or frequency that a device will need to exit and/or rejoin an established pile, and the size and putative unused capacity associated with the storage media, can allocate location slots within the pile for the identified media. The location within the pile of disks can be based at least in part on factors, such as relative unused storage capacity, the relative frequency, probability and likelihood that a device and its associated storage media will need to rejoin and/or depart from the pile. For example, it is unlikely that a kitchen appliance's associated non-volatile memory will need to exit or rejoin the constructed pile on a frequent basis. In contrast, a portable media player or notebook computer, by their very definitions, would have a high probability of needing to be removed and added to the pile on a frequent and periodic basis. Accordingly, volume controller 102 can assign a higher location slot to more static devices, such as kitchen appliances, and lower location slots to more dynamic or transitory devices, for example. Moreover, volume controller 102 can optimize location storage based on storage device access/retrieval speed and other network latency factors. As will be appreciated by those cognizant in the art other variations can be employed to denote a ranking or ordering, and any and all such variations, combinations, permutations, or derivatives thereof, are intended to fall within the spirit, ambit, and intent of the claimed subject matter.

An ancillary utility of the aforementioned ordering or ranking regime is that volume controller 102 can differentiate and distinguish between data and thus desist, or positively avoid, persisting crucial and/or high value data on storage media that might be deemed temporary and/or transient by volume controller 102. In other words, volume controller 102 can maintain and order or rank storage media according to a relative degree of transition. For instance, the more transitory or temporary a particular device or appliance is deemed to be, the less likely it is that volume controller 102 will distribute and/or allocate, or cause to distribute and/or allocate, crucial and/or very important data to be persisted on associated media affiliated with the device or appliance. Conversely, the greater the determined or ascertained relative permanency of the device or appliance, the more likely it is that volume controller 102 will disseminate and/or persist relatively important data on storage media affiliated with the device and/or appliance.

Where appliances and/or devices (e.g., video tape recorders, multimedia players, convection ovens, and the like) are ascertained to be rejoining an established pile of disks, volume controller 102 can access and/or revise any prior evaluation or estimation that may have been made regarding available free space on associated storage media confederated with the appliances and/or devices. Such an assessment can include accessing and revising one or more persisted tables, index sectors, databases and the like. On the other hand, where volume controller 102 determines that added appliances and/or devices have never constituted or contributed storage media to an established pile, and/or a pile is first being constructed, volume controller 102 can update and/or create appropriate tables and/or table entries to reflect construction and/or additions to the pile of disks. It should be noted at this juncture that while the claimed subject matter is elucidated in terms of tables, the subject matter as claimed is not so limited, as other appropriate data structures, such as, linked lists, trees (binary and/or multiway), stacks, queues, and the like can be employed without departing from the spirit, scope, and/or intent of the disclosed subject matter.

Once volume manager 102 has reevaluated, revised, and/or reappraised tables and/or other associated data structures to reflect the rejoining and/or addition of appliances and/or devices together with their associated storage media, volume control 102 can commence, or cause associated structures and components, to distribute, readjust, or more evenly reallocate extant data and/or newly acquired data across available storage media. Once again artificial intelligence and/or machine learning modalities can be employed to facilitate such load-balancing and/or redistribution of data extant and/or newly acquired or recently received. Additionally, volume controller 102 can ensure that more crucial, important, or critical data is mirrored and/or duplexed appropriately to ensure redundancy.

With regard to redundancy, volume controller 102 can employ data striping where logically sequential data is segmented so that segments can be written to multiple physical devices in a round-robin fashion. Volume controller 102 in addition can utilize disk mirroring or volume mirroring wherein logical disk volumes are replicated onto separate logical disk volumes in real-time to ensure continuous availability, concurrency, and accuracy. Such mirroring can be performed synchronously, asynchronously, semi-synchronously, and/or at dynamically determined and/or pre-established/pre-determined points in time. Moreover, volume controller 102 can utilize dedicated parity, distributed parity, and/or dual distributed parity to achieve data redundancy and integrity. Additionally, volume controller 102 can implement nested levels, wherein derivatives, combinations, and permutations of the aforementioned mirroring or duplexing, striping, dedicated parity, distributed parity, and/or dual distributed parity are utilized in conjunction, or selectively in combination, with one another.

Volume controller 102, based at least in part on determined or ascertained indications of whether or not a device and/or appliance is subject to being permanently or temporarily removed from the network topology 104, can nominate or designate appliances and/or devices, or more particularly, storage media associated with nominated or designated devices and/or appliances, as a hot spare. The hot spare, depending on a user specified and/or dynamically determined policy, can be employed to automatically and/or manually replace failing, failed, and/or temporarily and/or permanently removed storage media in the established redundant pile of inexpensive disk/devices configuration. Typically, the hot spare reduces meantime to recovery for the established pile and commensurately reduces the probability of second and/or tertiary storage media failure together with the associated data loss that can ensue. Accordingly, nominations or designations in relation to being a hot spare can be based on determinations made through use of artificial intelligence and/or machine learning modalities and/or systems, etc. Thus for example, appliances and/or devices that are fairly static—are not subject to periodic removal and addition to the network—are more likely to be nominated or designated as being a hot spare device. Conversely, devices and/or appliances that are rated as being transitory or exceedingly temporary may be discounted from taking on the role of being a hot spare device.

Figure 2:
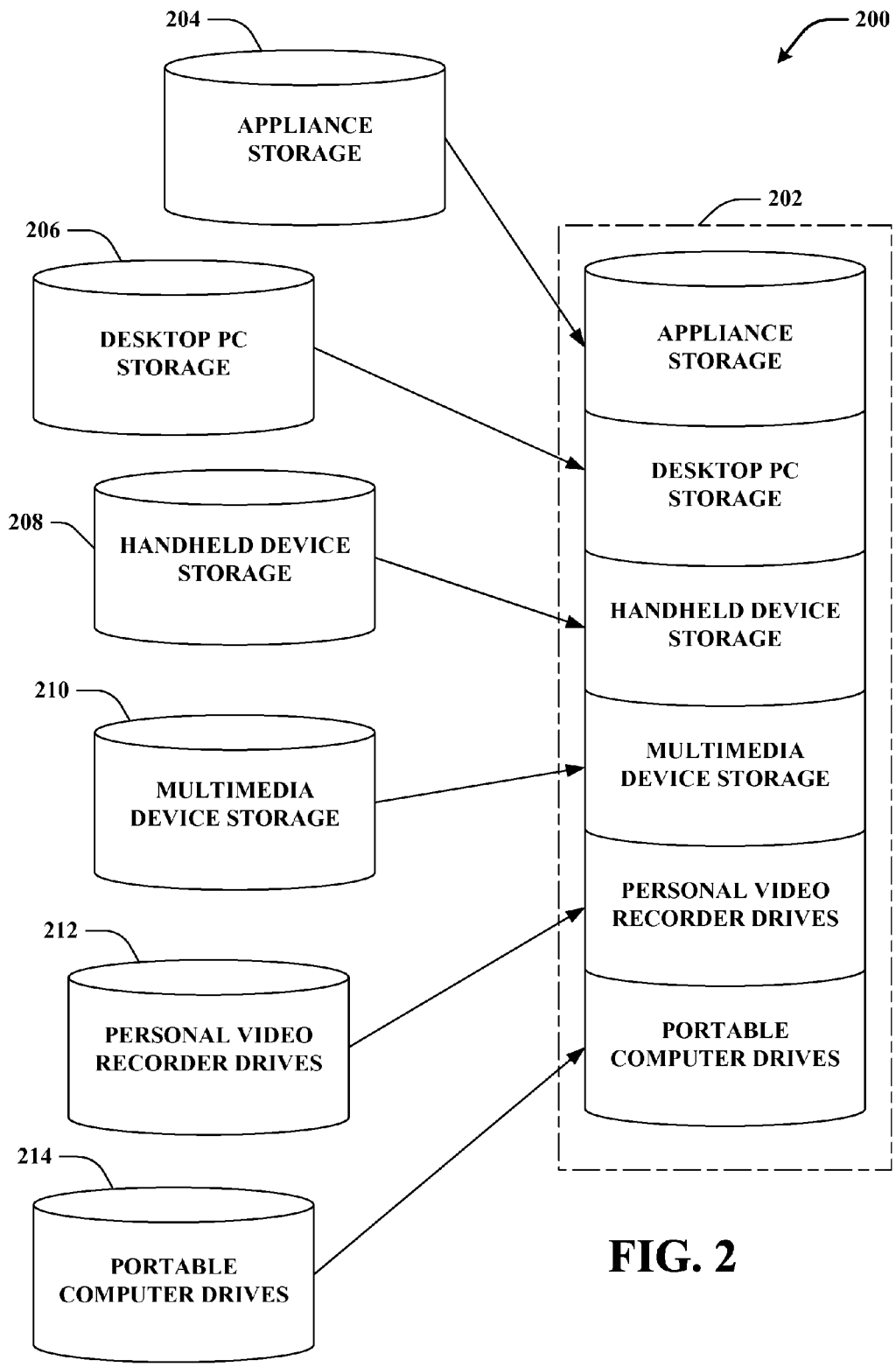
FIG. 2 provides an illustrative redundant pile of inexpensive disks/devices in accordance with one aspect of the claimed subject matter.

FIG. 2 depicts 200 and illustrative redundant pile of inexpensive disks/devices 202. As illustrated, the redundant pile of inexpensive devices/disks 202 can include storage media (e.g., both hard disks and/or nonvolatile memory employed in memory cards, handy drives, memory sticks, etc.) associated with typical home appliances and/or devices. Illustrated devices can include appliance storage 204 (e.g., storage media associated with kitchen stoves, microwave ovens, refrigerators, domestic robots, and the like), desktop PC storage (e.g., SCSI, ATA, IDE, SATA drives, storage effectuated via both temporary and/or permanent flash memory, etc.), hand-held device storage 208 (e.g., storage media confederated or associated with handheld devices such as Personal Digital Assistants (PDAs), cell phones, smart phones, multimedia and Internet enabled mobile phones, etc.), multimedia device storage 210 (e.g., storage associated with portable media playback and/or recording devices capable of storing and playing files in one or more media format), Personal Video Recorders (PVRs) and/or Digital Video Recorders (DVR) storage media 212, and storage media associated with portable computers 214 (e.g., laptops, notebook computers, tablet PCs, and the like). As will be appreciated by those of ordinary skill in the art, FIG. 2 does not connote or denote an established and/or preferred ordering or ranking established by volume controller 102, but merely provides a conceptual depiction of an illustrative pile. As will further be understood by those cognizant in the art, since the one or more devices and their associated storage media can be distributed over the extent of network topology 104 with no two devices and affiliated storage media necessarily being in contiguous proximity with one another, that volume controller 102 effectively establishes and/or constructs a virtual and/or logical redundant pile. Nevertheless, the disclosed and claimed subject matter is not necessarily so limited, and can find applicability where the redundant pile is established and/or constructed as a physical reality and/or entity and/or as a hybrid of a physical and/or logical pile with volume controller 102 maintaining overall control over the hybrid as circumstances dictate.

Figure 3:
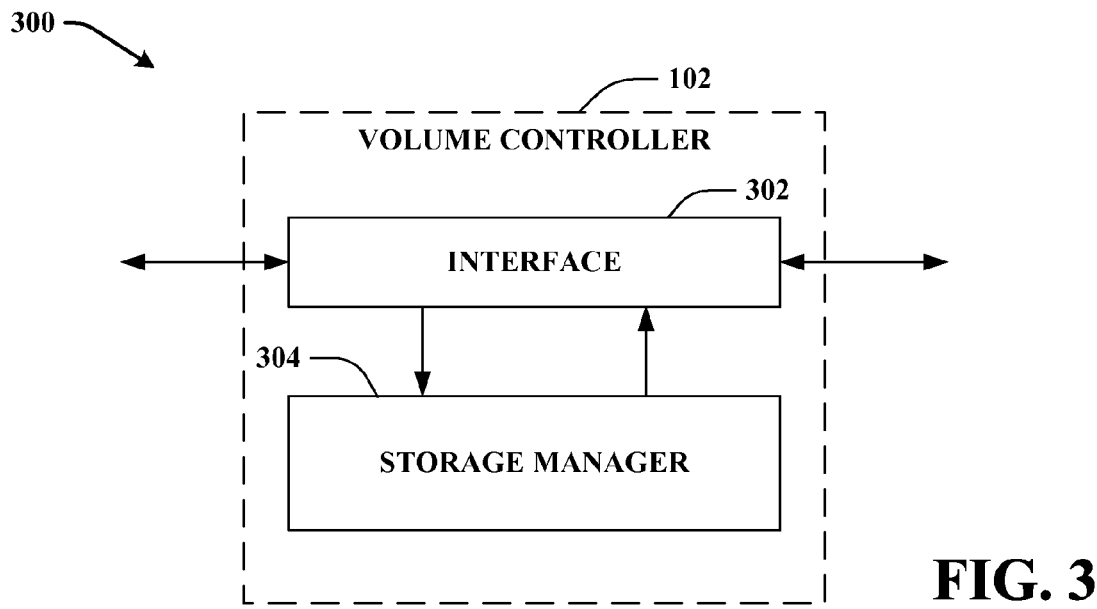
FIG. 3 provides a more detailed depiction of an illustrative volume controller that can be employed in accordance with an aspect of the claimed subject matter.

FIG. 3 provides a more detailed depiction 300 of volume controller 102. As illustrated volume 102 can include interface 302 (hereinafter referred to as "interface 302") that can communicate and interact with desktop computer 106, handheld device 108, portable computer 110, Personal Video Recorder (PVR) and/or Digital Video Recorder (DVD) 112, multimedia player 114, and/or household appliance 116 via networked topology 104. Further, volume controller 102 can include storage manager 304 that can construct, reorder, and identify devices and/or appliances and associated storage media, and can interact with identified devices and/or appliances via interface 302.

Interface 302 can receive data from a multitude of sources, such as for example, data associated with a particular client application, service, user, client, device, and/or entity involved with a portion of a transaction, and thereafter convey the received information to storage manager 304 further analysis. Additionally, interface 302 can receive analyzed data from storage manager 304 which then can be disseminated to the constituent devices that can form network topology 104.

Interface 302 can provide various adapters, connectors, channels, communication pathways, etc. to integrate the various components included in system 300 into virtually any operating system and/or database system and/or with one another. Additionally, interface 302 can provide various adapters, connectors, channels, communication modalities, etc. that provide for interaction with various components that can comprise system 300, and/or any other component (external and/or internal), data and the like associated with system 300.

Storage manager 304 can monitor the removal and/or addition of components (e.g., consumer and/or electronic/electrical appliances and/or devices) that currently constitute or once comprised or were included in network topology 104. Storage manager 304 on discovering the absence and/or addition of a previously affiliated device and/or presence of a newly added device can identify and classify the device, the size and unused capacity of storage media associated with added and/or previously associated device, and the type of storage media being employed by the detective device. Based at least in part on the foregoing data, storage manager 304 can construct, aggregate, and/or reorder the previously identified storage media into logical redundant piles of inexpensive disks/devices. Moreover, in reordering, constructing, and/or establishing logical redundant piles of inexpensive disks/devices, storage manager 304 can employ artificial intelligence and/or machine learning components and/or techniques, databases, and statistical and/or probabilistic methodologies to contemporaneously and/or concurrently establish precedence in relation to ordering or ranking of storage media, and the nominating of storage media to undertake the role of hot spares.

Storage manager 304 can, initialize, evaluate, appraise, reinitialize, reevaluate, reappraise, and/or revise tables and/or other associated data structures to reflect any changes that storage manager 304 may detect and/or identify during the course of operations. Further, storage manager 304 can employ one or more of disk striping, disk mirroring or duplexing, utilization of dedicated parity, distributed parity, and/or duel distributed parity. Additionally, storage manager 304 can effectuate the distribution and allocation of previously persisted, newly obtained (e.g., from a newly acquired device—one that has never been associated with the network topology), and/or currently acquired data over the entirety of the established pile to ensure the integrity, easy accessibility, and continued redundancy of the data.

Figure 4:
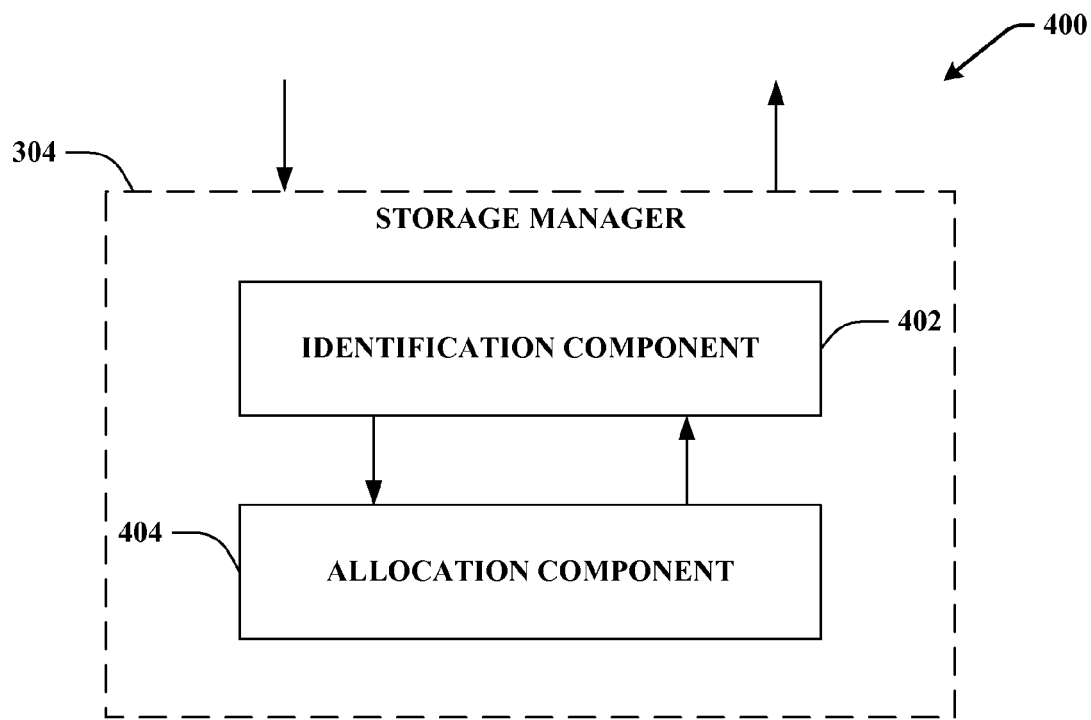
FIG. 4 illustrates a more detailed depiction of storage manager that can be employed in accordance with an aspect of the claimed subject mater.

FIG. 4 provides a more detailed depiction 400 of illustrative storage manager 304 in accordance with an aspect of the subject matter as claimed. As illustrated, storage manager 304 can include an identification component 402 that can continuously monitor addition and/or removal of devices and/or appliances to network topology 104. Additionally, storage manager 304 can also include allocation component of 404 that can utilize data obtained, derived, and/or concurrently and dynamically determined (e.g. via artificial intelligence, machine learning, external sources, and the like) to construct, establish and/or reorder redundant piles of inexpensive disks/devices.

Identification component 402 on detecting removals and/or additions to network 104 can identify and classify the type of device (e.g. handheld device, refrigerator with confederated flash memory and LCD display, portable multimedia playback and/or recording device, etc.), ascertain the total size and/or the potential unused capacity of storage media associated with newly added and/or previously associated device and/or appliance, and determine the type of media being utilized by the added and/or previously associated device and/or appliance. Once identification component 402 has ascertained the foregoing information, such information can be conveyed to allocation component 404 for further analysis and utilization.

Allocation component 404, based on the data, for instance, solicited, obtained, derived, and/or dynamically determined by an identification component 402, can, where an extant pile does not exist, assemble and/or logically fabricate a redundant pile of inexpensive disks/devices. Alternatively and/or additionally, where a pile currently exists, allocation component 404 can reorder storage media within the extant redundant pile to ensure improved redundancy, accessibility, and/or overall storage facilities for data within the established pile, and newly acquired and/or obtaining data (e.g., from a newly acquired device).

Allocation component 404 can utilize disk/data striping, disk mirroring or duplexing, dedicated parity, distributed parity, and/or duel distributed parity to ensure the consistency and integrity of data stored/persisted within an established or newly constructed pile. Moreover, allocation component 404 can also effectuate distribution of data to various disparate storage media and/or devices that can comprise the redundant pile of inexpensive devices/disks.

Figure 5:
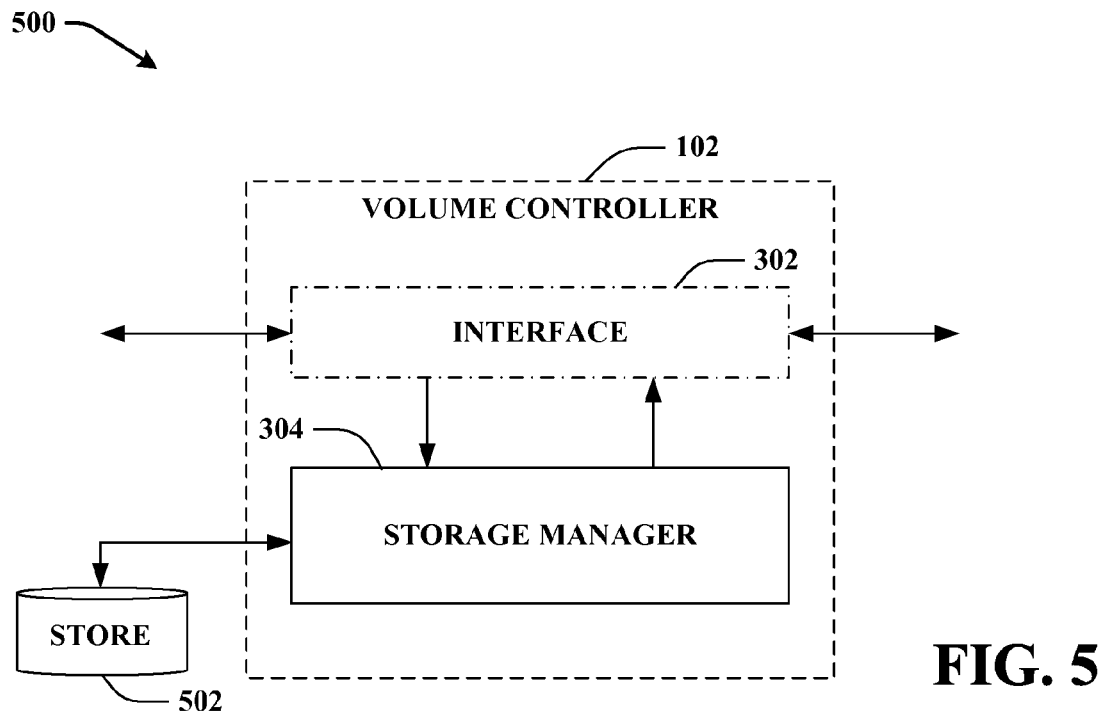
FIG. 5 illustrates a system implemented on a machine that manages various storage media associated with a plurality of diverse devices in accordance with an aspect of the claimed subject matter.

FIG. 5 depicts an aspect of a system 500 that manages various storage media associated with a plurality of diverse devices. System 500 can include volume controller 102 that can comprise interface 302 and storage manager 304. Additionally, system 500 can include store 502 that can include any suitable data necessary for storage manager 304 to identify various devices and allocate and/or establish associated storage media to a pile of redundant devices/disks. For instance, store 502 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 502 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 502 of the subject systems and methods is intended to comprise, without being limited to, these and any other suitable types of memory. In addition, it is to be appreciated that store 502 can be a server, a database, a hard drive, and the like.

Figure 6:
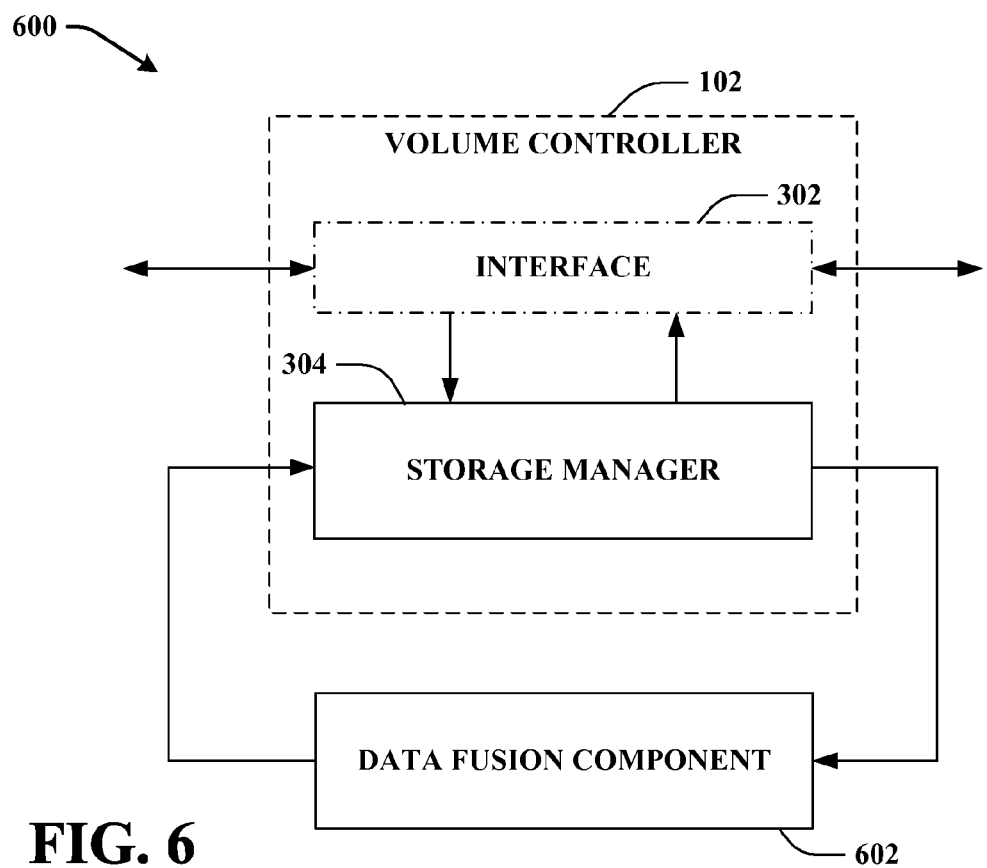
FIG. 6 provides a further depiction of a machine implemented system that manages various storage media associated with a plurality of diverse devices in accordance with an aspect of the subject matter as claimed.

FIG. 6 provides yet a further depiction of a system 600 that manages various storage media associated with a plurality of diverse devices in accordance with an aspect of the claimed subject matter. As depicted, system 600 can include a data fusion component 602 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 602 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 7:
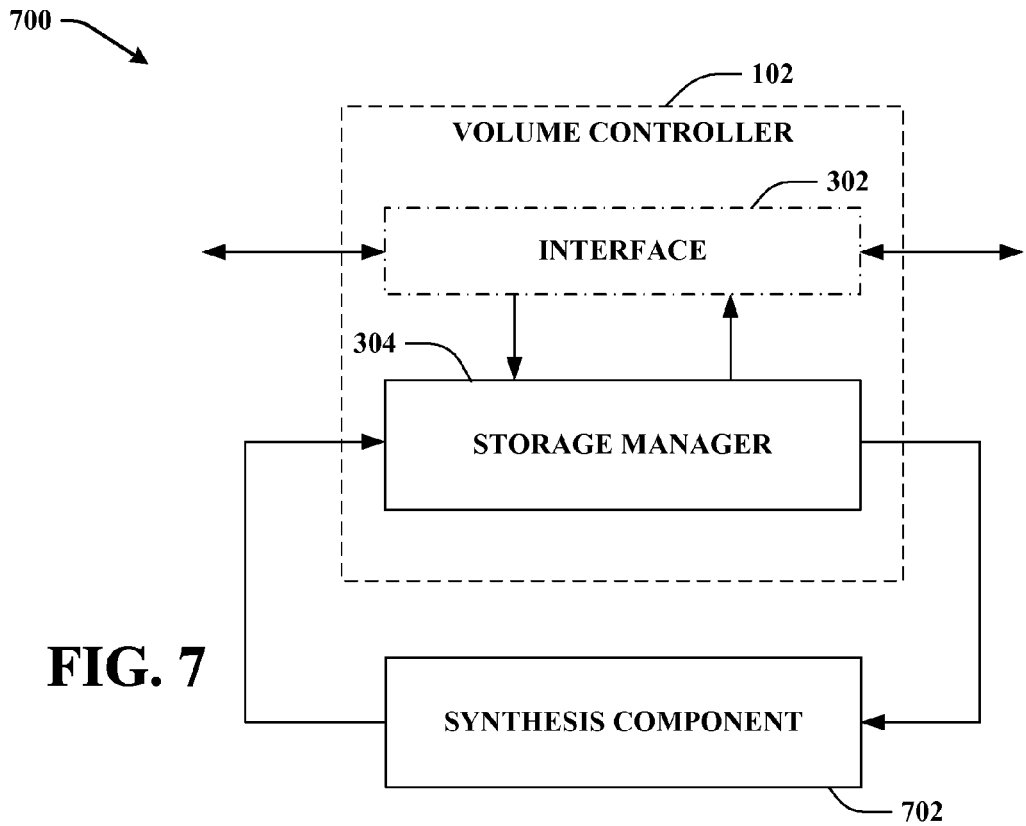
FIG. 7 illustrates yet another aspect of the machine implemented system that manages various storage media associated with a plurality of diverse devices in accordance with an aspect of the claimed subject matter.

FIG. 7 provides a further depiction of a system 700 that manages various storage media associated with a plurality of diverse devices in accordance with an aspect of the claimed subject matter. As illustrated storage manager 304 can, for example, employ synthesizing component 702 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 702 through combining and filtering can provide a set of information that can be more informative, all accurate (e.g., with respect to an entity's communicative or informational goals) and information from just one or two modalities, for example. As discussed in connection with FIG. 6, the data fusion component 602 can be employed to learn correlations between different data types, and the synthesizing component 702 can employ such correlations in connection with combining, or filtering the input data.

Figure 8:
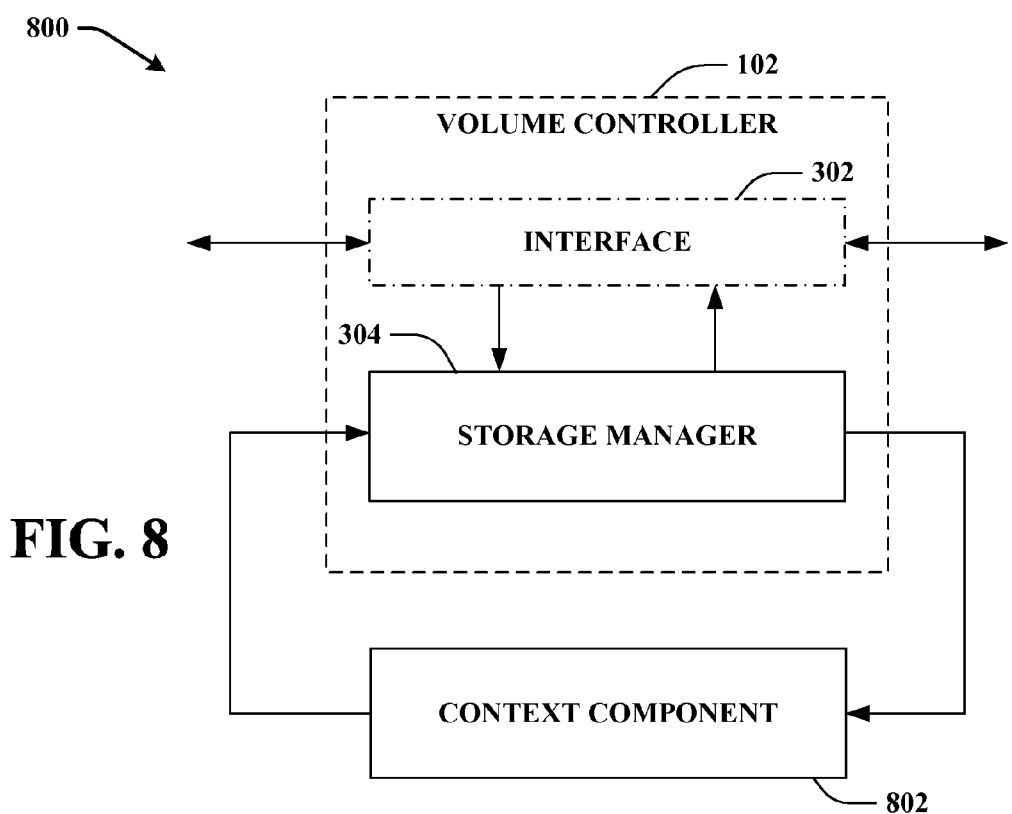
FIG. 8 depicts a further illustrative aspect of the machine implemented system that manages various storage media associated with a plurality of diverse devices in accordance with an aspect of the claimed subject matter.

FIG. 8 provides a further illustration of a system 800 that manages various storage media associated with a plurality of diverse devices in accordance with an aspect of the claimed subject matter. As illustrated storage manager 304 can, for example, employ context component 802 to determine context associated with a particular action or set of input data. As can be appreciated, context can play an important role with respect to understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 802 can provide current or historical data in connection with inputs to increase proper interpretation of inputs. For example, time of day may be helpful to understanding an input—in the morning, the word "drink" would likely have a high a probability of being associated with coffee, tea, or juice as compared to being associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 802 had knowledge that the user was not camping, and that it was near dinnertime, the utterance would be interpreted as "steak". On the other hand, if the context component 802 knew (e.g., via GPS system input) that the user recently arrived at a camping ground within a national park; it might more heavily weight the utterance as "stake".

In view of the foregoing, it is readily apparent that utilization of the context component 802 to consider and analyze extrinsic information can substantially facilitate determining meaning of sets of inputs.

Figure 9:
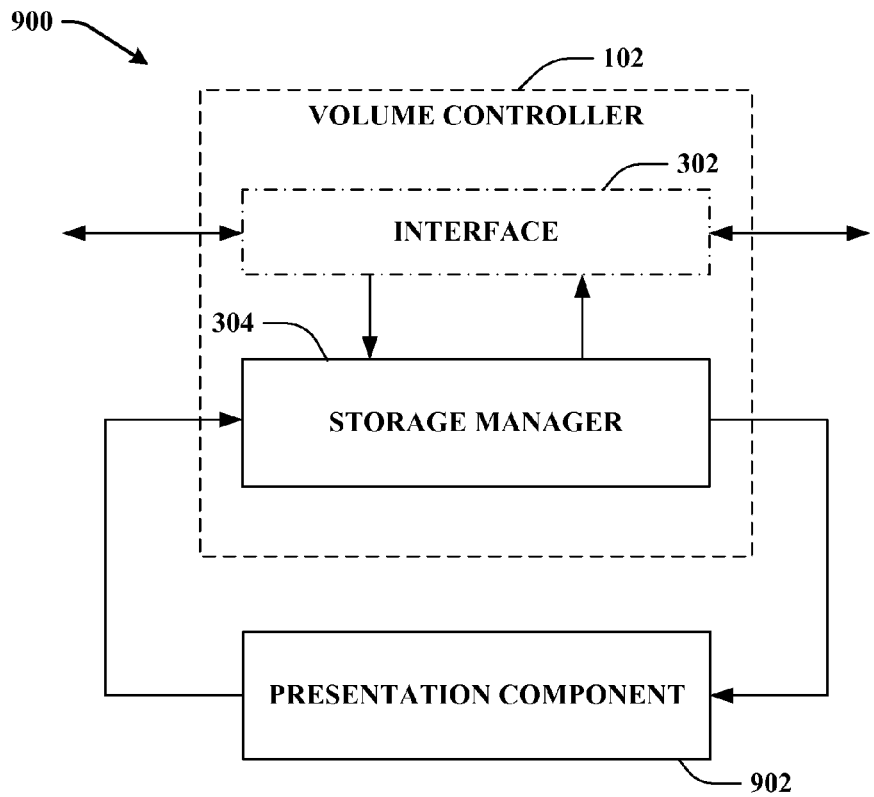
FIG. 9 illustrates another illustrative aspect of a system implemented on a machine that manages various storage media associated with a plurality of diverse devices in accordance of yet another aspect of the claimed subject matter.

FIG. 9 a further illustration of a system 900 that manages various storage media associated with a plurality of diverse devices in accordance with an aspect of the claimed subject matter. As illustrated, system 900 can include presentation component 902 that can provide various types of user interface to facilitate interaction between a user and any component coupled to storage manager 304. As illustrated, presentation component 902 is a separate entity that can be utilized with detection component. However, it is to be appreciated that presentation component 902 and/or other similar view components can be incorporated into storage manager 304 and/or a standalone unit. Presentation component 902 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into storage manager 304.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 10:
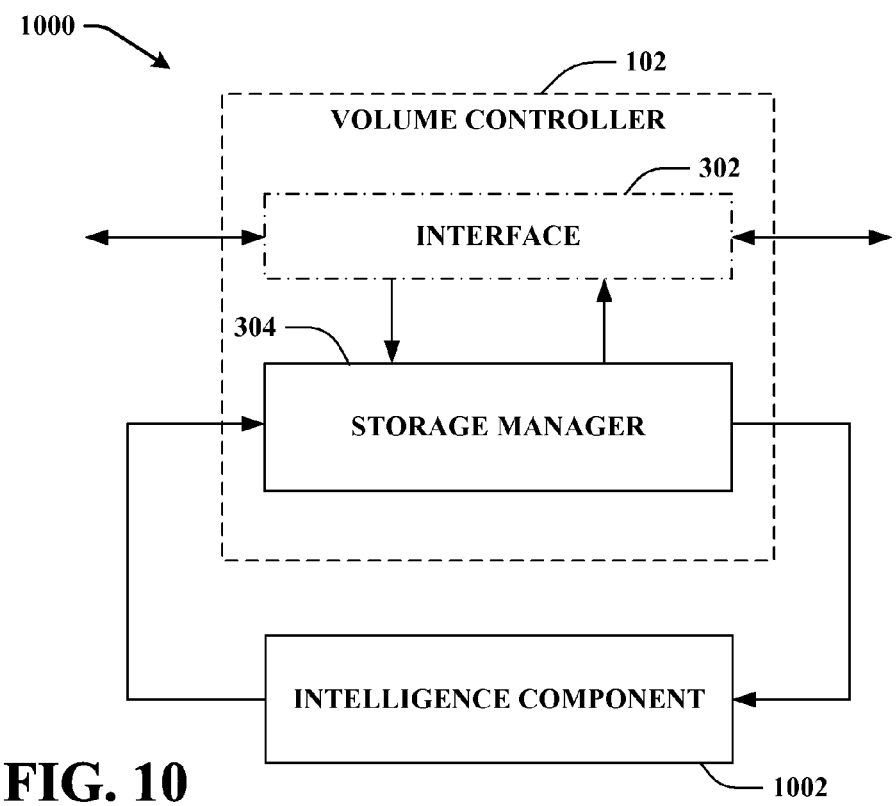
FIG. 10 depicts yet another illustrative aspect of a system that manages various storage media associated with a plurality of diverse devices in accordance with an aspect of the subject matter as claimed.

FIG. 10 depicts a system 1000 that employs artificial intelligence to effectuate and facilitate encapsulation of metadata within watermarks that can be associated with multimedia segments or presentations in accordance with an aspect of the subject matter as claimed. Accordingly, as illustrated, system 1000 can include an intelligence component 1002 that can be utilized, for example, to dynamically ascertain one or more of threshold wait times, and/or respective locations of volume controller 102 and other devices affiliated with network topology 104. Intelligence component 1002 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 1002 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 1002 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 11:
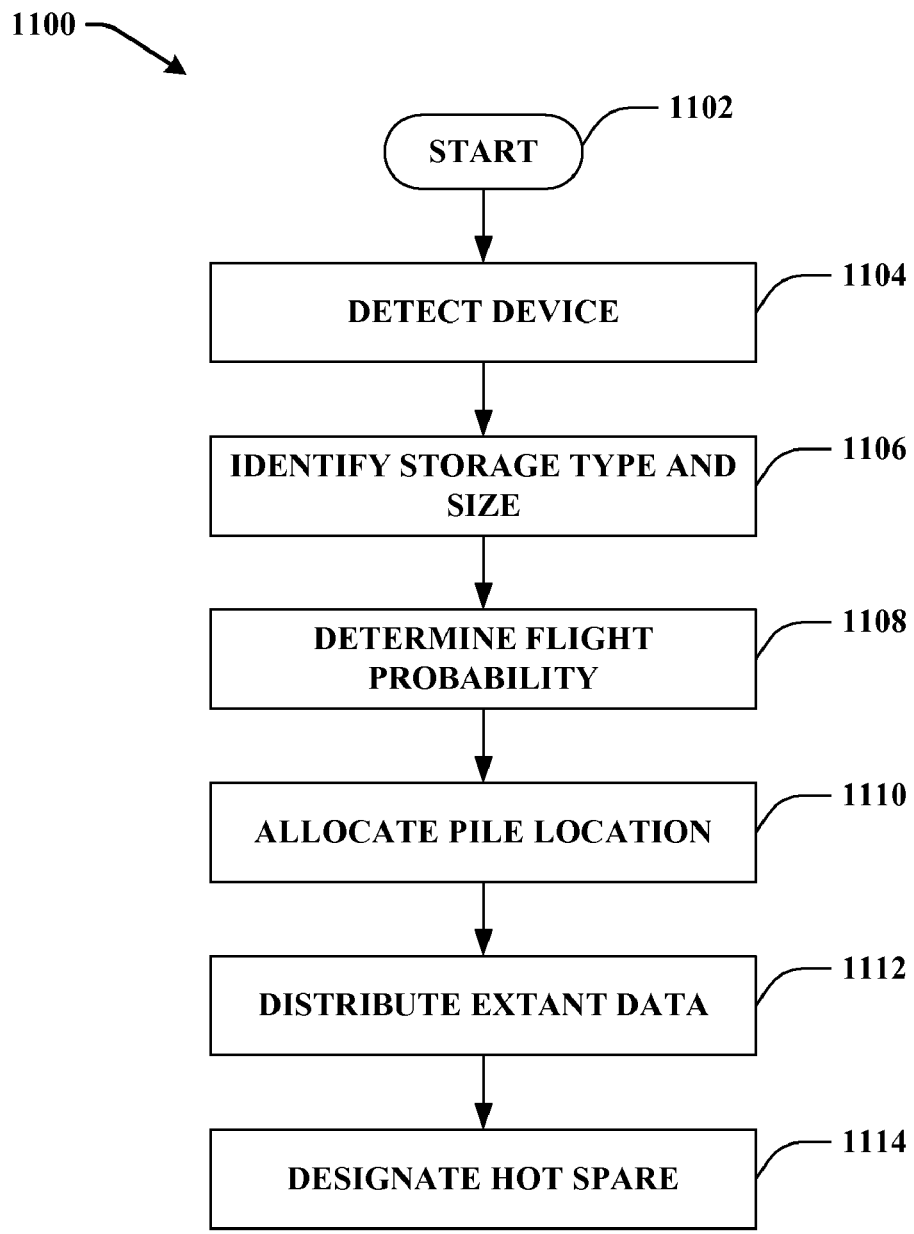
FIG. 11 illustrates a flow diagram of a machine implemented methodology that manages various storage media associated with a plurality of diverse devices in accordance with an aspect of the claimed subject matter.

In view of the exemplary systems shown and described supra, methodologies that may be implemented in accordance with the disclosed subject matter will be better appreciated with reference to the flow chart of FIG. 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 11 provides an illustrative flow diagram of a machine implemented methodology 1100 that manages various disparate storage media associated with a plurality of diverse devices and/or appliances situated over the entirety of a network topology. At 1102 various and sundry initialization tasks and processes can be undertaken after which method 1100 can proceed to 1104. At 1104 methodology 1100 can detect whether or not a device and/or appliance (e.g., laptop computers, desktop computers, washing machines, convection ovens, media players, hand-held devices, etc.) have been added and/or removed from the network (e.g., network topology 104). Where methodology 1100 detects the departure and/or arrival of devices (new or previously identified) at 1104, the method can proceed to 1106 where factors such as class of device and/or appliance can be established, the total size of associated storage media and free space thereon can be determined, the availability of the devices and the relative access/retrieval speed and other network latency factors can be identified, and the type of storage media utilized in conjunction with the device/appliance ascertained. At 1108 an assessment can be undertaken to determine the relative flight risk that the device poses. The flight risk (e.g., the relative probability that a device/appliance will exit and/or repeatedly rejoin the pile) can be determined in conjunction with one or more of artificial intelligence, machine learning, lookup tables, (e.g., persisted locally and/or accessed from remote databases, etc.) and/or equivalent modalities. At 1110 methodology 1100 can, based on the foregoing, determined, derived and/or inferred information can assign or allocate a pile location for the storage media associated with a newly added and/or recently rejoined device/appliance. At 1112 any extant data associated with the pre-established pile and/or data resident on the newly added and/or rejoining devices/appliances can be distributed across the extent of the pile in a manner that ensures the data is redundantly and accurately persisted, and is easily accessed. At 1114 the methodology can nominate and/or designate hot spare devices to further ensure that data integrity and/or storage media failure is at least mitigated if not obviated.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 12:
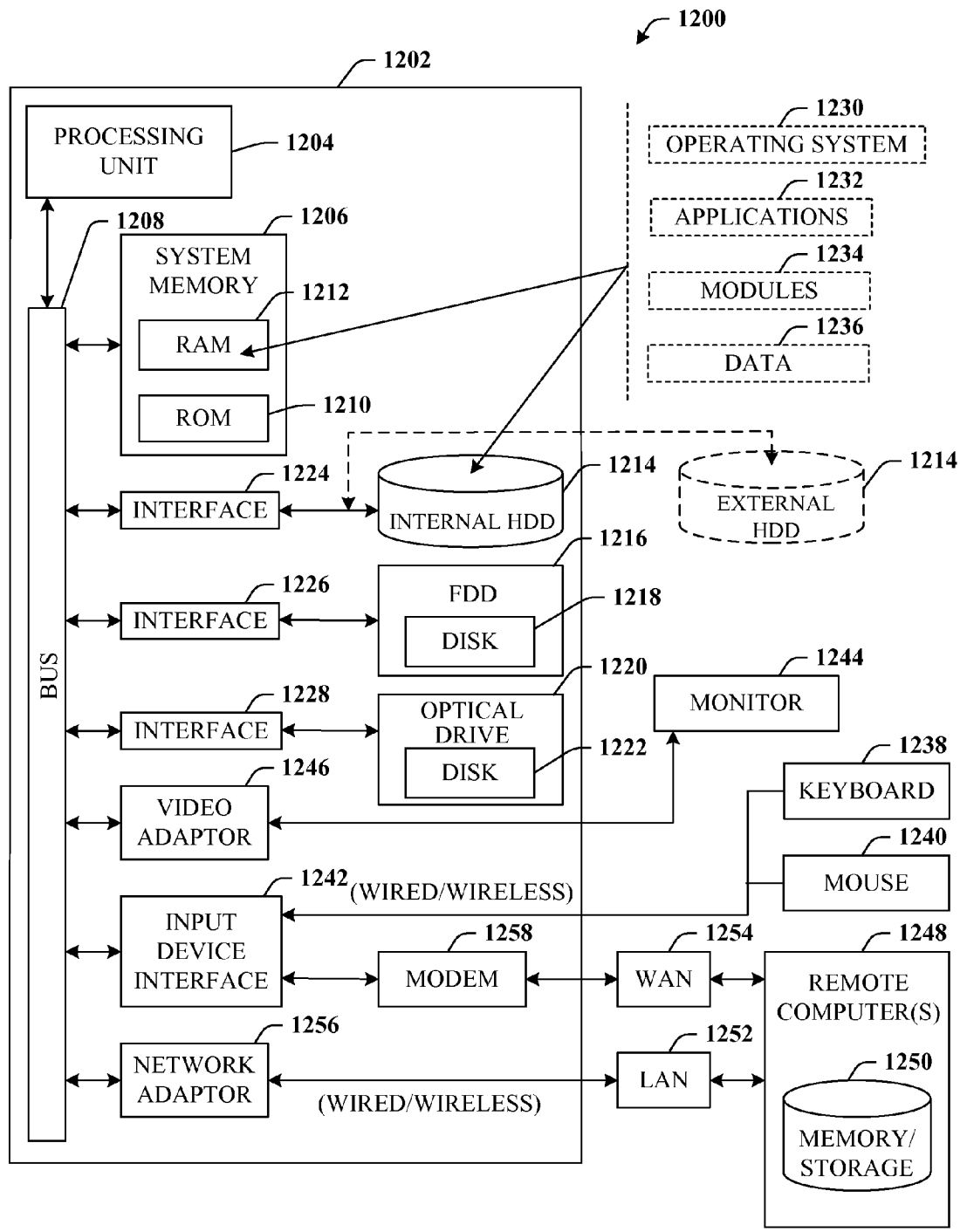
FIG. 12 illustrates a block diagram of a computer operable to execute the disclosed system in accordance with an aspect of the claimed subject matter.

Referring now to FIG. 12, there is illustrated a block diagram of a computer operable to execute the disclosed system. In order to provide additional context for various aspects thereof, FIG. 12 and the following discussion are intended to provide a brief, general description of a suitable computing environment 1200 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11 g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 13:
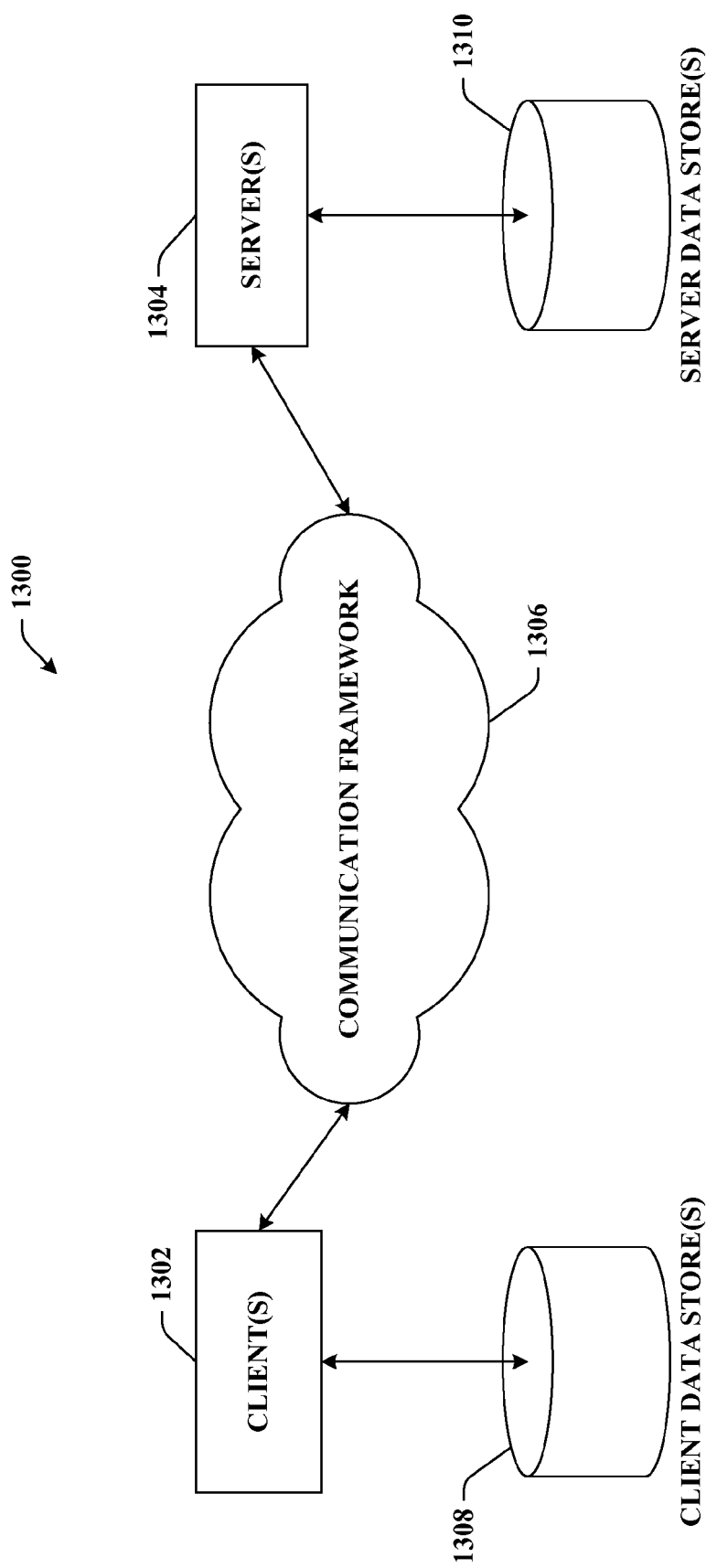
FIG. 13 illustrates a schematic block diagram of an exemplary computing environment for processing the disclosed architecture in accordance with another aspect.

Referring now to FIG. 13, there is illustrated a schematic block diagram of an exemplary computing environment 1300 for processing the disclosed architecture in accordance with another aspect. The system 1300 includes one or more client (s) 1302. The client(s) 1302 can be hardware and/or software (e.g., threads, processes, computing devices). The client(s)

1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that manages storage media associated with a plurality of disparate devices, the system comprising:
   a network of disparate devices, each device in the network associated with at least one storage device; and
   a component that:
      identifies each device in the network;
      ascertains a likelihood that a device will repeatedly leave or rejoin the network; and
      utilizes the likelihood to construct a redundant pile of inexpensive disks, wherein storage media associated with a device ascertained to be more likely to repeatedly leave and rejoin the network is deemed less likely to store at least one of crucial or very important data that is determined to be persisted.

2. The system of claim 1, wherein the network of disparate devices is selected from a group that includes a desktop computer, a household appliance, a multimedia player, and a portable computer.

3. The system of claim 2, wherein the household appliance includes a dishwasher, a refrigerator, a microwave oven, or a convection oven.

4. The system of claim 2, wherein the household appliance includes associated non-volatile memory or disk storage.

5. The system of claim 1, wherein the network employs power line communications to effectuate communication between the disparate devices.

6. The system of claim 1, wherein the component utilizes the likelihood to distribute extant data persisted on the at least one storage device to the redundant pile of inexpensive disks.

7. The system of claim 1, wherein the component ascertains a type of the at least one storage device.

8. The system of claim 1, wherein the component ascertains a total size of the at least one storage device.

9. The system of claim 1, wherein the component ascertains a free space associated with the at least one storage device.

10. The system of claim 1, wherein the likelihood that the device will repeatedly leave or rejoin the network is determined as a relative probability.

11. The system of claim 1, wherein the likelihood that the device will repeatedly leave or rejoin the network is determined utilizing one of artificial intelligence, machine learning, or lookup tables.

12. The system of claim 1, wherein the component assigns a pile location to the at least one storage device based at least in part on the likelihood that the device will repeatedly leave or rejoin the network.

13. The system of claim 1, wherein the component monitors and detects newly added devices to the network.

14. The system of claim 13, wherein the component based at least in part on the newly added devices re-orders the redundant pile of inexpensive disks.

15. The system of claim 1, wherein the component utilizes disk mirroring or disk striping to maintain redundancy of data persisted on the at least one storage device that comprises the redundant pile of inexpensive disks.

16. The system of claim 15, wherein the disk mirroring is performed synchronously, asynchronously, semi-synchronously, dynamically as determined by the component or at pre-determined points in time.

17. The system of claim 1, wherein the component utilizes dedicated parity, distributed parity or dual distributed parity to achieve data redundancy.

18. A method implemented by a machine that manages storage media associated with a plurality of devices that form a network, the method comprising:
   detecting devices added or removed from the network;
   ascertaining, by the machine, a likelihood that a device will repeatedly leave and rejoin the network;
   classifying a device based on the likelihood; and
   based at least in part on the likelihood, aggregating and ranking storage media associated with the plurality of devices to establish a logical redundant pile of inexpensive disks, wherein storage media associated with a device classified as more likely to repeatedly leave and rejoin the network is deemed less likely to store at least one of crucial or very important data that is determined to be persisted.

19. The method of claim 18, the method further comprising utilizing disk mirroring or disk striping to ensure redundancy of data persisted in the logical redundant pile of inexpensive disks.

20. A system that manages storage media associated with a plurality of household appliances that form a network, the system comprising:
   memory;
   at least one processor;
   modules stored in the memory and executed by the at least one processor, the modules including:
      a module for detecting a household appliance added or removed from the network;
      a module for:

ascertaining a likelihood that the household appliance will repeatedly leave and rejoin the network; and
classifying the household appliance as more or less transitory based on the likelihood; and
a module for aggregating and ranking storage media associated with the plurality of household appliances to establish a virtual redundant pile of inexpensive disks, the aggregating and ranking being based at least in part on the likelihood, wherein storage media associated with a household appliance classified as more transitory is deemed less likely to store crucial and/or very important data that is determined to be persisted.

* * * * *

UNITED STATES PATENT AND TRADEMARK OFFICE
CERTIFICATE OF CORRECTION

| | | |
|---|---|---|
| PATENT NO. | : 7,941,516 B2 | Page 1 of 1 |
| APPLICATION NO. | : 11/764047 | |
| DATED | : May 10, 2011 | |
| INVENTOR(S) | : Curtis G. Wong et al. | |

It is certified that error appears in the above-identified patent and that said Letters Patent is hereby corrected as shown below:

Title page, item (54), under "Title" column 1, line 2, delete "DRIVERS" and insert -- DRIVES --, therefor.

In column 1, line 2, delete "DRIVERS" and insert -- DRIVES --, therefor.

Signed and Sealed this
Twelfth Day of July, 2011

David J. Kappos
*Director of the United States Patent and Trademark Office*